(12) United States Patent
Otonari et al.

(10) Patent No.: US 9,315,634 B2
(45) Date of Patent: Apr. 19, 2016

(54) GRAFT COPOLYMER, PRODUCTION METHOD THEREFOR, RESIN COMPOSITION, AND MOLDED ARTICLE

(75) Inventors: Hiroaki Otonari, Hiroshima (JP); Takashi Miura, Hiroshima (JP); Toshihiro Kasai, Hiroshima (JP)

(73) Assignee: MITSUBISHI RAYON CO., LTD., Tokyo (JP)

( * ) Notice: Subject to any disclaimer, the term of this patent is extended or adjusted under 35 U.S.C. 154(b) by 158 days.

(21) Appl. No.: 13/977,300

(22) PCT Filed: Dec. 27, 2011

(86) PCT No.: PCT/JP2011/080238
§ 371 (c)(1),
(2), (4) Date: Jun. 28, 2013

(87) PCT Pub. No.: WO2012/091024
PCT Pub. Date: Jul. 5, 2012

(65) Prior Publication Data
US 2013/0281586 A1  Oct. 24, 2013

(30) Foreign Application Priority Data

Dec. 28, 2010  (JP) .................................. 2010-292245

(51) Int. Cl.
| | |
|---|---|
| *C08G 77/442* | (2006.01) |
| *C08F 283/12* | (2006.01) |
| *C08L 51/08* | (2006.01) |
| *C08L 69/00* | (2006.01) |

(52) U.S. Cl.
CPC ............ *C08G 77/442* (2013.01); *C08F 283/12* (2013.01); *C08F 283/124* (2013.01); *C08L 51/085* (2013.01); *C08L 69/00* (2013.01); *C08L 2201/02* (2013.01)

(58) Field of Classification Search
CPC .............................. C08G 77/442; C08L 69/00
USPC ........................................................ 524/504
See application file for complete search history.

(56) References Cited

U.S. PATENT DOCUMENTS

| 5,079,293 A | 1/1992 | Alsamarraie et al. |
|---|---|---|
| 2003/0181573 A1 | 9/2003 | Miyatake et al. |
| 2004/0220302 A1* | 11/2004 | Saegusa et al. ............... 524/161 |
| 2005/0038149 A1* | 2/2005 | Hashimoto et al. ........... 524/261 |
| 2010/0157217 A1 | 6/2010 | Kim et al. |

FOREIGN PATENT DOCUMENTS

| JP | 11 228745 | 8/1999 |
|---|---|---|
| JP | 2010 144165 | 7/2010 |
| JP | 2010 275523 | 12/2010 |
| JP | 2012 007088 | 1/2012 |
| WO | 03 004566 | 1/2003 |
| WO | 2008 026575 | 3/2008 |
| WO | 2010 024311 | 3/2010 |

OTHER PUBLICATIONS

Extended European Search Report issued May 28, 2014 in Patent Application No. 11853692.9.
International Search Report Issued Apr. 17, 2012 in PCT/JP11/080238 Filed Dec. 27, 2011.

* cited by examiner

*Primary Examiner* — Ling Choi
*Assistant Examiner* — Lanee Reuther
(74) *Attorney, Agent, or Firm* — Oblon, McClelland, Maier & Neustadt, L.L.P

(57) ABSTRACT

Disclosed are a method of producing a graft copolymer, comprising polymerizing a vinyl monomer (B) containing a polyfunctional vinyl monomer (b1) in the presence of a polyorganosiloxane rubber (A) comprising more than 20% by mass of a toluene-insoluble matter, wherein a mass percentage of the polyfunctional vinyl monomer (b1) is 11 to 19% by mass based on 100% by mass of a total amount of the polyorganosiloxane rubber (A) and the vinyl monomer (B); a graft copolymer obtained by the method; a resin composition being prepared by blending the graft copolymer with a resin and having high impact resistance and heat resistance and sufficient flame retardancy; and a molded article obtained by molding the resin composition.

18 Claims, No Drawings

GRAFT COPOLYMER, PRODUCTION METHOD THEREFOR, RESIN COMPOSITION, AND MOLDED ARTICLE

TECHNICAL FIELD

The present invention relates to a graft copolymer, a production method therefor, a resin composition prepared by blending the graft copolymer with a resin, and a molded article obtained by molding the resin composition.

BACKGROUND ART

Molded articles using thermoplastic resins are widely used in various fields such as fields of home appliances, electrical and electronic apparatuses, and OA apparatuses such as printers. These molded articles need to have high impact resistance, heat resistance, and flame retardancy. Particularly, thinner and lighter molded articles have been developed recently for the purpose of cost reduction. For this reason, such lighter and thinner molded articles also need to have sufficient impact resistance, heat resistance, and flame retardancy.

There are a variety of methods as a method for improving the function such as impact resistance and flame retardancy of the molded article using a thermoplastic resin. Examples of the method include a method in which a composite rubber graft copolymer obtained by graft polymerizing a vinyl monomer is blended with a composite rubber comprising a polyorgano-siloxane rubber and a polyalkyl (meth)acrylate rubber (Patent Literature 1). Examples of the method also include a method in which a graft copolymer obtained by graft polymerizing a polyfunctional vinyl monomer with another vinyl monomer is blended with a low crosslinked polyorganosiloxane rubber (Patent Literatures 2 to 4).

Unfortunately, the methods according to Patent Literatures 1 to 4 do not provide sufficient impact resistance, particularly sufficient impact resistance under a low temperature, heat resistance, and flame retardancy.

CITATION LIST

Patent Literature

Patent Literature 1: JP2000-17029
Patent Literature 2: WO03/068835
Patent Literature 3: WO04/092236
Patent Literature 4: WO03/004566

SUMMARY OF INVENTION

Technical Problem

An object of the present invention is to provide a graft copolymer that is blended with a resin to attain a resin composition having high impact resistance particularly at a low temperature and heat resistance and sufficient flame retardancy, a method of producing the graft copolymer, a resin composition prepared by blending the graft copolymer with a resin, and a molded article obtained by molding the resin composition.

Solution to Problem

The present invention is a method of producing a graft copolymer, comprising polymerizing a vinyl monomer (B) containing a polyfunctional vinyl monomer (b1) in the presence of a polyorganosiloxane rubber (A) comprising more than 20% by mass of a toluene-insoluble matter,
wherein a mass percentage of the polyfunctional vinyl monomer (b1) is 11 to 19% by mass based on 100% by mass of a total amount of the polyorganosiloxane rubber (A) and the vinyl monomer (B).

Further, the present invention is a graft copolymer obtained by the production method above, a resin composition containing 100 parts by mass of a resin and 1 to 20 parts by mass of the graft copolymer, and a molded article obtained by molding the resin composition.

Further, the present invention is a graft copolymer, wherein when 5 parts by mass of the graft copolymer is blended with 100 parts by mass of a polycarbonate having a viscosity average molecular weight of 22000, 0.3 parts by mass of a phenol antioxidant represented by the following formula (1), 0.3 parts by mass of a phosphorus antioxidant represented by the following formula (2), and 0.5 parts by mass of a polytetrafluoroethylene having a mass average molecular weight of 8000000 to 15000000, (1) Charpy impact strength at −30° C. is 20 kJ/m² or more, and
(2) a total burning time of a molded article having a thickness of 1.6 mm in a UL94V test is 40 s or less:

[Formula 1]

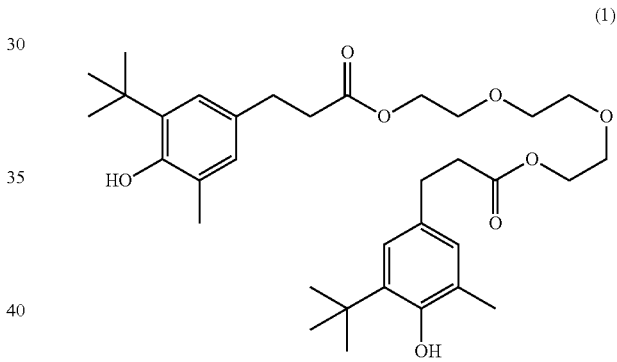

[Formula 2]

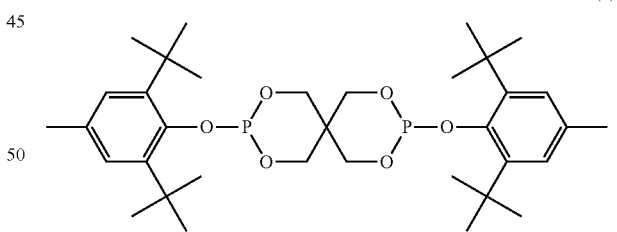

Further, the present invention is a resin composition containing 100 parts by mass of a resin and 1 to 20 parts by mass of the graft copolymer, and a molded article obtained by molding the resin composition.

Advantageous Effects of Invention

The graft copolymer of the present invention is blended with a resin to attain a resin composition having high impact resistance particularly at a low temperature and heat resistance and sufficient flame retardancy. Moreover, the resin composition of the present invention has high impact resistance particularly at a low temperature and heat resistance and sufficient flame retardancy because the graft copolymer is blended. Moreover, the molded article of the present invention has high impact resistance particularly at a low temperature and heat resistance and sufficient flame retardancy because the molded article is obtained by molding the resin composition.

DESCRIPTION OF EMBODIMENT

The graft copolymer of the present invention is a graft copolymer obtained by polymerizing a vinyl monomer (B) in the presence of a polyorganosiloxane rubber (A).

The polyorganosiloxane rubber (A) is a polyorganosiloxane rubber comprising more than 20% by mass of a toluene-insoluble matter. A polyorganosiloxane rubber having a vinyl polymerizable functional group is preferable. The polyorganosiloxane rubber (A) is obtained, for example, by polymerizing a dimethylsiloxane compound (a1), a siloxane having a vinyl polymerizable functional group (a2), and if desired, a siloxane crosslinking agent (a3).

Examples of the dimethylsiloxane compound (a1) include 3- or more membered dimethylsiloxane ring bodies. Particularly, 3- to 7-membered ring bodies are preferable. Specific examples thereof include hexamethylcyclotrisiloxane, octamethylcyclotetrasiloxane, decamethylcyclopentasiloxane, and dodecamethylcyclohexasiloxane. Among these, octamethylcyclotetrasiloxane is preferably used as the main component because its particle diameter distribution is easily controlled. These dimethylsiloxane compounds (a1) may be used singly or in combinations of two or more.

The siloxane having a vinyl polymerizable functional group (a2) is a siloxane compound that can be bonded to the component (a1) via a siloxane bond. The siloxane having a vinyl polymerizable functional group (a2) is a component for introducing a vinyl polymerizable functional group into the side chain or terminal of polyorganosiloxane. The vinyl polymerizable functional group acts as a graft active site when the siloxane having a vinyl polymerizable functional group (a2) is chemically bonded to a vinyl (co)polymer to be formed from the vinyl monomer (B). Specific examples thereof include methacryloyloxysilanes such as β-methacryloyloxyethyldi-methoxymethylsilane, γ-methacryloyloxypropyldimethoxymethylsilane, γ-methacryloyloxypropylmethoxydimethylsilane, γ-methacryloyloxypropyltrimethoxysilane, γ-methacryloyloxypropylethoxydiethylsilane, γ-methacryloyloxypropyldiethoxymethylsilane, and δ-methacryloyloxybutyldiethoxymethylsilane; vinylsiloxanes such as tetramethyltetravinylcyclotetrasiloxane; vinylphenylsilanes such as p-vinylphenyldimethoxymethylsilane; and mercaptosiloxanes such as γ-mercaptopropyldimethoxymethylsilane and γ-mercaptopropyltrimethoxysilane. These siloxanes having a vinyl polymerizable functional group (a2) may be used singly or in combinations of two or more.

Examples of the siloxane crosslinking agent (a3) include trifunctional or tetrafunctional silane crosslinking agents. Specific examples thereof include trimethoxymethylsilane, triethoxyphenylsilane, tetramethoxysilane, tetraethoxysilane, and tetrabutoxysilane. Preferably, 1 to 5% by mass of the siloxane crosslinking agent (a3) is contained in the polyorganosiloxane rubber (A) for the strength and flame retardancy of the resin composition prepared by blending the graft copolymer.

Examples of a method of producing the polyorganosiloxane rubber (A) include a method in which a siloxane mixture containing the component (a1), the component (a2), and if desired, the component (a3) is emulsified with an emulsifier and water to prepare an organosiloxane latex; the organosiloxane latex is turned into a fine particle state using a homomixer for turning the latex into a fine particle state by a shear force caused by high speed rotation or a homogenizer for turning the latex into a fine particle state by a jet force generated by a high pressure generator; polymerization is performed using an acid catalyst under a high temperature, and the acid is neutralized with an alkaline substance to obtain a polyorganosiloxane latex.

Examples of a method of adding an acid catalyst include a method of mixing an acid catalyst with a siloxane mixture, an emulsifier, and water, and a method of dropping an organosiloxane latex in which a siloxane mixture is turned into fine particles into a high-temperature acid aqueous solution at a constant rate.

For the method of producing the polyorganosiloxane rubber (A), a method of mixing a siloxane mixture, an emulsifier, and water with an acid aqueous solution without a micelle forming ability and performing polymerization is preferable because the particle diameter of the polyorganosiloxane rubber (A) is easily controlled.

For the emulsifier, anionic emulsifiers are preferable. Specific examples of the anionic emulsifiers include sodium lauryl sulfate, alkylbenzene sulfonic acid sodium, and polyoxyethylene nonylphenyl ether sulfuric acid ester sodium. Among these, alkylbenzene sulfonic acid sodium is particularly preferable. These emulsifiers may be used singly or in combinations two or more.

Specific examples of the acid catalysts include sulfonic acids such as aliphatic sulfonic acids, aliphatic substituted benzene sulfonic acids, and aliphatic substituted naphthalene sulfonic acids; and mineral acids such as sulfuric acid, hydrochloric acid, and nitric acid. Among these, mineral acids without a micelle forming ability such as sulfuric acid, hydrochloric acid, and nitric acid are preferable. Use of mineral acids facilitates to narrow the particle diameter distribution of the polyorganosiloxane latex, and to improve a poor appearance of the resin composition attributed to the emulsifier component in the polyorganosiloxane latex. Further, use of mineral acids also is preferable because of improvement in impact strength at a low temperature. These acid catalysts may be used singly or in combinations of two or more.

Examples of a method of mixing the siloxane mixture, the emulsifier, and water, and/or the acid catalyst include mixing by high speed stirring and mixing with a high pressure emulsifying apparatus such as a homogenizer. Among these, a method using a homogenizer is preferable because this method provides narrower distribution of the particle diameter of the polyorganosiloxane latex.

The polymerization temperature in production of the polyorgano-siloxane rubber (A) is preferably 50 to 95° C., and more preferably 70 to 90° C. The polymerization time is preferably 2 to 15 hours, and more preferably 5 to 10 hours when the acid catalyst is mixed with the siloxane mixture, the emulsifier, and water, and the mixture is turned into fine particles and then polymerized. The polymerization can be stopped, for example, by cooling the reaction solution, and further neutralizing the polyorganosiloxane latex with an alkaline substance such as sodium hydroxide, potassium hydroxide, and sodium carbonate.

The volume average particle diameter of the polyorganosiloxane rubber (A) is preferably 50 to 600 nm, and more preferably 100 to 500 nm. Here, the volume average particle diameter means a value measured with a capillary particle diameter distribution measurement apparatus. At a volume average particle diameter of 50 nm or more, impact resistance at a low temperature is easily exhibited. At a volume average particle diameter of 600 nm or less, reduction in the flame retardancy of the thermoplastic resin composition prepared by blending the graft copolymer is easily suppressed.

The polyorganosiloxane rubber (A) comprises preferably more than 20% by mass, more preferably 50% by mass or more, and particularly preferably 80% by mass or more of the toluene-insoluble matter. When the content of the toluene-insoluble matter is more than 20% by mass, high impact resistance is attained. As the content of the toluene-insoluble matter is higher, impact resistance is more improved. The content of the toluene-insoluble matter can be measured by the following method. A polyorgano-siloxane rubber (A) component is extracted from the polyorganosiloxane latex using 2-propanol. The extracted component is dried at room temperature to completely remove the 2-propanol component with a vacuum dryer. Next, 0.5 g of the polyorganosiloxane rubber (A) is precisely weighed, and immersed in 80 mL of toluene at room temperature for 24 hours. Then, the toluene solution is centrifuged at 12,000 rpm for 60 minutes, and the obtained polyorganosiloxane rubber (A) is precisely weighed again. Thus, the mass fraction (% by mass) of the toluene-insoluble matter is measured.

The content of the toluene-insoluble matter in the polyorganosiloxane rubber (A) can be controlled, for example, by adjusting the content of the siloxane crosslinking agent (a3) in the polyorganosiloxane rubber (A). As the content of the siloxane crosslinking agent (a3) is higher, the content of the toluene-insoluble matter of the polyorganosiloxane rubber (A) is higher.

These polyorganosiloxane rubbers (A) may be used singly or in combinations of two or more.

The polyorganosiloxane rubber (A) may be a composite rubber of a polyorganosiloxane rubber and polyalkyl (meth) acrylate. The composite component can be added in the range in which flame retardancy is not impaired much. Examples of polyalkyl (meth)acrylate include methacrylates such as methyl methacrylate, ethyl methacrylate, 2-ethylhexyl methacrylate, and phenyl methacrylate; and those obtained by polymerizing acrylates such as methyl acrylate, ethyl acrylate, and butyl acrylate. Those obtained by polymerizing butyl acrylate are preferable for impact resistance.

The vinyl monomer (B) is a vinyl monomer containing a polyfunctional vinyl monomer (b1). The polyfunctional vinyl monomer (b1) is a monomer having two or more polymerizable unsaturated bonds in the molecule. Specific examples of the polyfunctional vinyl monomer (b1) include allyl methacrylate, triallyl cyanurate, triallyl isocyanurate, diallyl phthalate, ethylene glycol dimethacrylate, 1,3-butylene glycol dimethacrylate, and divinylbenzene. Among these, allyl methacrylate is preferable because this has a high effect of exhibiting impact resistance, heat resistance, and flame retardancy. These polyfunctional vinyl monomers (b1) may be used singly or in combinations of two or more.

The vinyl monomer (B) may contain a monofunctional vinyl monomer (b2) when necessary. Specific examples of the monofunctional vinyl monomer (b2) are one or more of aromatic vinyl monomers such as styrene, α-methyl styrene, and vinyl toluene; methacrylates such as methyl methacrylate, ethyl methacrylate, 2-ethylhexyl methacrylate, and phenyl methacrylate; acrylates such as methyl acrylate, ethyl acrylate, and butyl acrylate; and vinyl cyanide monomer such as acrylonitrile and methacrylonitrile. These monofunctional vinyl monomers (b2) may be used singly or in combinations of two or more.

In the present invention, a monomer (C) other than the vinyl monomer (B) may be polymerized within the range in which the effect of exhibiting impact resistance, heat resistance, and flame retardancy is not impaired. Examples of the other monomer (C) include unsaturated carboxylic acid monomers and maleimide monomers. Specific examples of the unsaturated carboxylic acid monomer include acrylic acid, methacrylic acid, (anhydrous) maleic acid, fumaric acid, and itaconic acid. Specific examples of the maleimide monomer include maleimide, N-methylmaleimide, N-phenylmale-imide, N-(2-methylphenyl)maleimide, N-(4-hydroxyphenyl)maleimide, and N-cyclohexylmaleimide. These other monomers (C) may be used singly or in combinations of two or more.

The graft copolymer of the present invention is produced by polymerizing (graft polymerizing) the vinyl monomer (B) in the presence of the polyorganosiloxane rubber (A). This polymerization can be performed at a single stage or a multistage by a radical polymerization method using a radical polymerization initiator by adding the vinyl monomer (B) to the latex of the polyorganosiloxane rubber (A).

In the polymerization of the graft copolymer (100% by mass), the amount of the polyorganosiloxane rubber (A) to be used is preferably 60 to 90% by mass, and more preferably 75 to 85% by mass. At an amount of the polyorganosiloxane rubber (A) to be used of 60% by mass or more, sufficient flame retardancy is exhibited. At an amount of the polyorgano-siloxane rubber (A) to be used of 90% by mass or less, sufficient impact resistance is exhibited.

In the polymerization of the graft copolymer (100% by mass), the amount of the vinyl monomer (B) to be used is preferably 10 to 40% by mass, and more preferably 15 to 25% by mass. At an amount of the vinyl monomer (B) to be used of 10% by mass or more, high impact resistance is exhibited. At an amount of the vinyl monomer (B) to be used of 40% by mass or less, sufficient flame retardancy is exhibited.

The mass percentage of the polyfunctional vinyl monomer (b1) contained in the vinyl monomer (B) is 11 to 19% by mass, and preferably 13 to 17% by mass based on 100% by mass of the total amount of the polyorganosiloxane rubber (A) and the vinyl monomer (B). At a content of the polyfunctional vinyl monomer (b1) of 11% by mass or more, impact resistance and flame retardancy improve. Additionally, heat resistance also improves because a crosslinking structure is formed. At a content of the polyfunctional vinyl monomer (b1) of 19% by mass or less, the graft copolymer tends to have high dispersibility, and impact resistance tends to improve.

Preferably, the graft copolymer is produced by using no other monomer (C) and using the polyorganosiloxane rubber (A) and the vinyl monomer (B) whose total amount is 100% by mass.

Examples of the radical polymerization initiator include organic peroxides, inorganic peroxides, azo initiators, and redox initiators in combination of an oxidizing agent and a reducing agent. Examples of organic peroxides include cumene hydroperoxide, t-butyl hydroperoxide, benzoyl peroxide, t-butylperoxy isopropyl carbonate, di-t-butyl peroxide, t-butylperoxy laurate, lauroyl peroxide, succinic acid peroxide, cyclohexanone peroxide, and acetylacetone peroxide. Examples of inorganic peroxides include potassium persulfate and ammonium persulfate. Examples of azo initiators include 2,2'-azobisisobutyronitrile and 2,2'-azobis-2,4-dimethyl valeronitrile. Examples of redox initiators include initiators in combination of ferrous sulfate.ethylenediaminetetraacetic acid disodium salt.rongalit.hydroperoxide. As the radical polymerization initiator, organic peroxides or inorganic peroxides are preferable because they have high reactivity. The redox initiators are also preferable. The initiators in combination of ferrous sulfate.ethylenediaminetetraacetic acid disodium salt.rongalit.hydroperoxide are more preferable.

In the graft polymerization, in addition to the polyorganosiloxane rubber (A) and the vinyl monomer (B), a variety of chain transfer agents may be added to adjust the molecular weight or graft rate of the graft copolymer. Examples of the chain transfer agent include t-dodecylmercaptan, n-octylmercaptan, ⁻n-tetradecylmercaptan, and n-hexylmercaptan.

In the graft polymerization, an emulsifier may be added to stabilize the polymerization latex and further control the average particle diameter of the graft copolymer. For the emulsifier, cationic emulsifiers, anionic emulsifiers, and nonionic emulsifiers are preferable, and sulfonic acid salt emulsifiers, sulfuric acid salt emulsifiers, and carboxylic acid salt emulsifiers are more preferable. Particularly when the graft copolymer to be obtained is blended with a target that is a thermoplastic resin having an ester bond, sulfonic acid salt emulsifiers are still more preferable for suppression of hydrolysis.

The graft copolymer in powder can be recovered, for example, by putting the graft copolymer latex produced by the method into hot water in which a metal salt such as calcium chloride, acetic acid calcium, magnesium sulfate, and aluminum sulfate is dissolved, and separating the graft copolymer by salting-out and solidification. The graft copolymer may be recovered using a spray dry method. Particularly when the graft copolymer to be obtained is blended with a thermoplastic resin having an ester bond, recovery by salting-out using calcium salt is preferable for suppression of hydrolysis.

The volume average particle diameter of the graft copolymer measured with a capillary particle diameter distribution measurement apparatus is preferably 50 to 1000 nm, more preferably 200 to 1,000 nm, and particularly preferably 250 to 600 nm. At a volume average particle diameter of 50 nm or more, sufficient impact resistance at a low temperature is easily exhibited. At a volume average particle diameter of 1,000 nm or less, reduction of the flame retardancy of the resin composition with which the graft copolymer is blended is easily suppressed.

The mass average molecular weight (hereinafter, referred to as an "Mw") of the acetone-soluble content in the graft copolymer is preferably 50,000 or less, and more preferably 1,000 to 50,000. At an Mw of 50,000 or less, reduction in the dispersibility of the graft copolymer in a resin can be prevented, and high fluidity can be easily exhibited without impairing flame retardancy. At an Mw of 1,000 or more, sufficient flame retardancy and impact resistance can be easily exhibited without reducing the dispersibility of the graft copolymer in a resin.

The resin composition of the present invention is a composition prepared by blending the graft copolymer described above with a resin. For this resin, generally known thermoplastic resins can be used, for example. Specific examples thereof include olefin resins such as polypropylene (PP) and polyethylene (PE); styrene resins (St resins) such as polystyrene (PS), high impact polystyrene (HIPS), (meth)acrylic acid ester.styrene copolymers (MS), styrene.acrylonitrile copolymers (SAN), styrene.maleic anhydride copolymers (SMA), acrylonitrile.butadiene.styrene copolymers (ABS), acrylonitrile.styrene.acrylate copolymers (ASA), and acrylonitrile.ethylene-propylene-diene.styrene (AES); acrylic resins (Ac resins) such as polymethyl methacrylate (PMMA); polycarbonate resins (PC resins); polyamide resins (PA resins); polyester resins (PEs resins) such as polyethylene terephthalate (PET) and polybutylene terephthalate (PBT); engineering plastics such as (modified) polyphenylene ether resins (PPE resins), polyoxymethylene resins (POM resins), polysulfone resins (PSO resins), polyarylate resins (PAr resins), polyphenylene resins (PPS resins), and thermoplastic polyurethane resins (PU resins); thermoplastic elastomers (TPE) such as styrene elastomers, olefin elastomers, vinyl chloride elastomers, urethane elastomers, polyester elastomers, polyamide elastomers, fluorine elastomers, 1,2-polybutadiene, and trans-1,4-polyisoprene; polymer alloys such as PC resin/St resin alloys such as PC/ABS, PVC resin/St resin alloys such as polyvinyl chloride (PVC)/ABS, PA resin/St resin alloys such as PA/ABS, PA resin/polyolefin resin alloys such as PA resin/TPE alloys and PA/PP, PC resin/PEs resin alloys such as PBT resin/TPE and PC/PBT, alloys of olefin resins such as polyolefin resin/TPE and PP/PE, PPE resin alloys such as PPE/HIPS, PPE/PBT, and PPE/PA, and PVC resin/Ac resin alloys such as PVC/PMMA; and hard, semi-hard, soft vinyl chloride resins. Among these, polycarbonate resins are preferable from the viewpoint of impact resistance and flame retardancy. These resins may be used singly or in combinations of two or more. Moreover, a compatibilizer such as a graft copolymer may be used in combination.

Examples of the polycarbonate resin include polymers obtained by reacting an aromatic dihydroxy compound and/or a small amount of a polyhydroxy compound with phosgene or carbonic diester. The polycarbonate resin may be linear or branched. The polycarbonate resin may be a homopolymer or a copolymer.

Examples of the aromatic dihydroxy compound include 2,2-bis(4-hydroxyphenyl)propane (that is, bisphenol A), tetramethyl bisphenol A, bis(4-hydroxyphenyl)-p-diisopropylbenzene, hydroquinone, resorcinol, and 4,4-dihydroxydiphenyl. These can be used singly or in combinations of two or more. For the aromatic dihydroxy compound, compounds having one or more tetraalkylphosphonium sulfonate groups bonded to the aromatic dihydroxy compound can be used.

To obtain a branched polycarbonate resin, part of the aromatic dihydroxy compound may be substituted by a branching agent. Examples of the branching agent include polyhydroxy compounds such as phloroglucin, 4,6-dimethyl-2,4,6-tri(4-hydroxyphenyl)hepten-2,4,6-dimethyl-2,4,6-tri(4-hydroxyphenyl)heptane, 2,6-dimethyl-2,4,6-tri(4-hydroxyphenyl)hepten-3,1,3,5-tri(4-hydroxyphenyl) benzene, and 1,1,1-tri(4-hydroxyphenyl)ethane; 3,3-bis(4-hydroxy aryl)oxyindole (that is, isatinbisphenol), 5-chloroisatin, 5,7-dichloroisatin, and 5-bromisatin. The amount of the branching agent to be used is usually 0.01 to 10 mol %, and preferably 0.1 to 2 mol % based on the aromatic dihydroxy compound.

For the polycarbonate resin, polycarbonate resins obtained from the aromatic dihydroxy compound containing bisphenol A are preferable because of heat resistance and flexibility. For the polycarbonate resin, copolymers mainly containing a polycarbonate resin, for example, polymers having polycarbonate and a siloxane structure or copolymers of polycarbonate and an oligomer can be used. These polycarbonate resins can be used singly or in combinations of two or more.

The molecular weight of the polycarbonate resin is preferably 16,000 to 30,000, and more preferably 18,000 to 28,000. The molecular weight is the viscosity average molecular weight in terms of the solution viscosity measured at a temperature of 25° C. using methylene chloride as a solvent. At a viscosity average molecular weight of 30,000 or less, the flame retardant resin composition of the present invention tends to have high melt fluidity. At a viscosity average molecular weight of 16,000 or more, the molded article of the present invention tends to have high impact resistance. To adjust the molecular weight of the polycarbonate resin, for example, part of the aromatic dihydroxy compound described above may be substituted by a monovalent aromatic hydroxy compound such as m-methylphenol, p-methylphenol, m-propylphenol, p-propylphenol, p-tert-butylphenol, and p-long-chain alkyl-substituted phenol.

The method of producing the polycarbonate resin is not particularly limited. The polycarbonate resin can be produced by a known phosgene method (interface polymerization method) or a melting method (ester exchange method). When the aromatic polycarbonate resin obtained by the melting method is used, the aromatic polycarbonate resin can be used by adjusting the amount of an OH group in the terminal group of the aromatic polycarbonate resin.

The amount of the graft copolymer to be blended in the thermoplastic resin composition is 0.5 to 20 parts by mass, preferably 1 to 10 parts by mass based on 100 parts by mass of the resin. At an amount of the graft copolymer to be blended of 1 part by mass or more, high impact resistance and flame retardancy are exhibited. At an amount to be blended of 20 parts by mass or less, the intrinsic properties of the resin can be prevented from being impaired.

To adjust physical properties and properties to more desired ones, in addition to the resin and the graft copolymer, a variety of additives may be added to the thermoplastic resin composition of the present invention in the range in which the object of the prevent invention is not impaired. Examples of the additives include pigments and dyes; reinforcing agents such as glass fibers, metallic fibers, metallic flakes, and carbon fibers; fillers; phenol antioxidants such as 2,6-di-butyl-4-methylphenol and 4,4'-butylidene-bis(3-methyl-6-t-butylphenol); phosphite antioxidants such as tris(mixed, mono- and diphenyl) phosphite and diphenyl.isodecyl phosphite; sulfur antioxidants such as dilauryl thiodipropionate, dimyristyl thiodipropionate, and distearyl thiodipropionate; benzotriazole ultraviolet light absorbers such as 2-hydroxy-4-octoxybenzophenone and 2-(2-hydroxy-5-methylphenyl)benzotriazole; light stabilizers such as bis(2,2,6,6-tetramethyl-4-piperidinyl); antistatic agents such as hydroxylalkylamine and sulfonic acid salts; lubricants such as ethylenebisstearylamide and metal soap; flame retardants such as tetrabromophenol A, decabromophenol oxide, tetrabromobisphenol A (TBA) epoxy oligomers, TBA polycarbonate oligomers, antimony trioxide, triphenyl phosphite (TPP), and phosphoric acid esters; and modified fluorinated resins obtained by polymerizing PTFE (polytetrafluoroethylene) or a vinyl monomer and mixing the obtained hard polymer with a fluorinated resin (anti-dripping agents comprising a PTFE modified with a vinyl polymer or the like).

The modified fluorine resin is a mixture of a fluorine resin with a hard polymer obtained by polymerizing one or more vinyl monomers. The modified fluorine resin can be obtained by polymerizing a vinyl monomer in a solution in which a fluorine resin is dispersed, or by mixing a liquid of a hard polymer obtained by polymerizing a vinyl monomer with a liquid of a fluorine resin or mixing a solid of a hard polymer obtained by polymerizing a vinyl monomer with a solid of a fluorine resin. Examples of the vinyl monomer include aromatic vinyl monomers such as styrene; (meth)acrylic acid ester monomers such as methyl acrylate and methyl methacrylate; vinyl carboxylate monomers such as vinyl acetate and vinyl butyrate; olefin monomers such as ethylene and propylene; and diene monomers such as butadiene and isoprene. For the modified fluorinated resin, the modified PTFE is preferable. Examples of commercially available products of the modified PTFE include trade names "METABLEN A3800" and "METABLEN A3750" (made by MITSUBISHI RAYON CO., LTD.), trade names "TSAD001" and "CX-500" (made by Pacific Interchem Co., Ltd.), and a trade name "Blendex 449" (made by Chemtura Corporation).

When the modified fluorinated resin is blended, the amount of the modified fluorinated resin to be blended in the resin composition is preferably 0.05 to 10 parts by mass, and more preferably 0.1 to 5 parts by mass based on 100 parts by mass of the resin. At an amount of a fluorine resin-containing product to be blended of 0.05 parts by mass or more, flame retardancy improves. At an amount to be blended of 10 parts by mass or less, the appearance of a molded article is not impaired.

A method of blending a graft copolymer with a resin to produce a resin composition is not particularly limited. Use of a melt mixing method is preferable. Moreover, a small amount of a solvent may be used when necessary. Specifically, a predetermined amount of a resin and a predetermined amount of a graft copolymer that are essential components, and if desired, a predetermined amount of any component are blended, and kneaded with a typical kneader such as a roll, a Banbury mixer, a single screw extruder, and a twin screw extruder. Thereby, the resin composition can be prepared. These components can be subjected to batch operation or continuous operation. The order of mixing the components is not particularly limited. The resin composition is preferably formed into pellets.

When the graft copolymer of the present invention is blended with a resin to prepare the resin composition, the graft copolymer can also be identified based on the physical properties of the resin composition such as impact strength and the total burning time. Namely, the graft copolymer of the present invention is a graft copolymer wherein when 5 parts by mass of the graft copolymer is blended with 100 parts by mass of polycarbonate having a viscosity average molecular weight of 22000, 0.3 parts by mass of the phenol antioxidant represented by the formula (1), 0.3 parts by mass of the phosphorus antioxidant represented by the formula (2), and 0.5 parts by mass of polytetrafluoroethylene having a mass average molecular weight of 8000000 to 15000000, (1) Charpy impact strength at −30° C. is 20 kJ/m$^2$ or more, and (2) a total burning time of a molded article having a thickness of 1.6 mm in the UL94V test is 40 s or less.

Further, in the graft copolymer, preferably, (3) a deflection temperature under load at a load of 1.8 MPa is 118° C. or more.

For a polytetrafluoroethylene having a mass average molecular weight of 8000000 to 15000000, acrylic modified polytetrafluoroethylenes containing a polytetrafluoroethylene having a mass average molecular weight of 8000000 to 15000000 can also be used. In this case, blending is performed such that the amount of polytetrafluoroethylene is 0.5 parts by mass.

The molded article of the present invention is obtained by molding the resin composition described above. The molded article of the present invention has high impact resistance and heat resistance and sufficient flame retardancy. Applications of the molded article are not particularly limited. For example, the molded article of the present invention can be widely used as molded articles that need impact resistance and flame retardancy at a low temperature, for example, construction materials, automobiles, toys, sundries such as stationery, and casings for OA apparatuses and home appliances. Particularly, the molded article of the present invention is very useful for casings for home appliances.

For the method of producing the molded article of the present invention, a known production method can be used except that the resin composition of the present invention is used.

EXAMPLES

Hereinafter, the present invention will be described in detail with reference to Examples. The present invention will not be limited by the description below. In Examples, "part" means "part by mass." Measurements in Examples were performed as follows.

[Volume Average Particle Diameter (dv)]

A latex containing particles was diluted with distilled water to produce 0.1 mL of a sample of the diluted latex having a concentration of approximately 3%. The volume average particle diameter (dv) of the sample was measured using a capillary particle diameter distribution measurement apparatus (CHDF2000 type (trade name), made by MATEC Instrument Companies, Inc. (U.S.A.)). The measurement condition was a flow rate of 1.4 mL/min, a pressure of approximately 2.76 MPa (approximately 4,000 psi), and a temperature of 35° C. The measurement used a capillary cartridge for separating particles and a carrier solution, and the solution was made substantially neutral. Before the measurement, monodisperse polystyrene whose particle diameter was known (made by Duke Scientific Corporation (U.S.A.)) was used as a standard particle diameter substance. The particle diameters of 20 to 800 nm at 12 points in total were measured, and a calibration curve was created. For the volume average particle diameter (dv), the analysis value in volume distribution of the particle diameter measurement result was defined as the volume average particle diameter (dv).

[Toluene-Insoluble Matter]

The polyorganosiloxane rubber (A) was extracted from the latex of the polyorganosiloxane rubber (A) using 2-propanol, and dried at room temperature. Then, the 2-propanol component was completely removed with a vacuum dryer. Next, 0.5 g of the polyorganosiloxane rubber (A) was precisely weighed, and immersed in 80 mL of toluene at room temperature for 24 hours. The toluene solution was centrifuged at 12,000 rpm for 60 minutes, and the separated polyorganosiloxane rubber (A) was precisely weighed. Thereby, the mass fraction (% by mass) of the toluene-insoluble matter was calculated.

[Graft Rate]

1 g of the graft copolymer in powder was dissolved in 50 g of acetone, and reflux and extraction were performed at 70° C. for 6 hours. Then, using a centrifuge (CRG SERIES (trade name), made by Hitachi, Ltd.), centrifugation was performed under 4° C. at 14,000 rpm for 30 minutes. Next, the solution was removed by decantation, and a precipitate was separated and dried with a vacuum dryer at 50° C. for 24 hours. Then, the mass of the precipitate was measured. The graft rate (units: % by mass) was calculated by the following expression.

graft rate=(mass of precipitate after drying/1)×100

[Mw of Acetone-Soluble Content]

The acetone-soluble content obtained by the method (portion removed by decantation) was subjected to measurement of the molecular weight by gel permeation chromatography (GPC). The measurement condition in GPC was as follows, and the Mw was determined from the calibration curve based on a standard polystyrene.
apparatus: "HLC8220" (trade name, made by Tosoh Corporation) column: "TSKgel SuperHZM-M" (trade name, made by Tosoh Corporation) (4 columns having an inner diameter of 4.6 mm and a length of 15 cm, exclusion limit: 4×106)
eluent: THF (tetrahydrofuran)
flow rate of the eluent: 0.35 mL/min
measurement temperature: 40° C.
amount of sample to be injected: 10 μL (sample concentration of 0.1%)

[Impact Resistance (Charpy Impact Strength)]

According to ISO 179, a Charpy impact test was performed at 23° C. and −30° C., Charpy impact strength was measured. Then, impact resistance was evaluated.

[Flame Retardancy]

Using a burning rod of 125 mm×13 mm×1.6 mm, the total burning time was measured and evaluated based on the UL94V test. Thereby, flame retardancy was evaluated.

[Heat Resistance]

Heat resistance was measured according to ISO 75. A load was 1.8 MPa.

Production Example 1

Production of Polyorganosiloxane Rubber (A-1) Latex

The raw material mixture shown below was stirred with a homomixer at 10,000 rpm for 5 minutes, and passed through a homogenizer at a pressure of 20 MPa twice to obtain a stable pre-mixed latex (a-1).
Raw Material Mixture;
component (a1): "YF393" (trade name, octamethylcyclotetrasiloxane, made by Momentive Performance Materials Japan LLC) 96 parts
component (a2): "KBM502" (trade name, γ-methacryloyloxypropyldimethoxymethylsilane, made by Shin-Etsu Chemical Co., Ltd.) 2 parts
component (a3): "AY43-101" (trade name, tetraethoxysilane, made by Dow Corning Toray Silicone Co., Ltd.) 2 parts
anionic emulsifier: sodium dodecylbenzenesulfonate 1.00 part
deionized water 150 parts 250 parts of the pre-mixed latex (a-1) was charged into a separable flask including a cooling pipe, and a mixture of 0.20 parts of sulfuric acid and 49.8 parts of deionized water was dropped over 3 minutes. Subsequently, the aqueous solution was heated to 80° C. and kept in this state for 7 hours to perform polymerization. Then, the reaction product was cooled. Next, the reaction product was kept at room temperature for 6 hours, and neutralized with a sodium hydroxide aqueous solution to obtain a polyorganosiloxane rubber (A-1) latex.

The polyorganosiloxane rubber (A-1) latex was dried at 180° C. for 30 minutes, and the solid content was determined (hereinafter, the same method was used as the method of measuring a solid content). The solid content was 29.8%. The volume average particle diameter in the latex was 265 nm.

Production Example 2

Production of Polyorganosiloxane Rubber (A-2) Latex

A polyorganosiloxane rubber (A-2) latex was obtained in the same manner as in Production Example 1 except that the amount of the component (a1) was changed to 96.7 parts and the amount of the component (a3) was changed to 1.3 parts.

The solid content in the polyorganosiloxane rubber (A-2) latex was 29.3%, and the volume average particle diameter was 260 nm.

Production Example 3

Production of Polyorganosiloxane Rubber (A-3) Latex

A polyorganosiloxane rubber (A-3) latex was obtained in the same manner as in Production Example 1 except that the amount of the component (a1) was changed to 97.5 parts and the amount of the component (a3) was changed to 0.5 parts. The solid content in the polyorganosiloxane rubber (A-3) latex was 29.1%, and the volume average particle diameter was 258 nm.

Production Example 4

Production of Polyorganosiloxane Rubber (A-4) Latex

A polyorganosiloxane rubber (A-4) latex was obtained in the same manner as in Production Example 1 except that the amount of the component (a1) was changed to 98 parts and the amount of the component (a3) was changed to 0 parts. The solid content in the polyorganosiloxane rubber (A-4) latex was 30.1%, and the volume average particle diameter was 260 nm.

Production Example 5

Production of Polyorganosiloxane Rubber (A-5) Latex

The raw material mixture shown below was stirred with a homomixer at 10,000 rpm for 5 minutes, and passed through a homogenizer at a pressure of 20 MPa twice to obtain a stable pre-mixed latex (a-5).
Raw Material Mixture;
component (a1): "YF393" 96 parts
component (a2): "KBM502" 2 parts
component (a3): "AY43-101" 2 parts
anionic emulsifier: sodium dodecylbenzenesulfonate 0.67 parts
acid catalyst: dodecylbenzenesulfonic acid 0.67 parts
deionized water 200 parts 300 parts of the pre-mixed latex (a-5) was charged into a separable flask including a cooling pipe, and heated to 80° C. and kept in this state for 7 hours to perform polymerization. Then, the reaction product was cooled. Next, the reaction product was kept at room temperature for 6 hours, and neutralized with a sodium hydroxide aqueous solution to obtain a polyorgano-siloxane rubber (A-5) latex. The solid content in the polyorganosiloxane rubber (A-5) latex was 29.3%, and the volume average particle diameter was 140 nm.

Production Example 6

Production of Polyorganosiloxane Rubber (A-6) Latex

The raw material mixture shown below was stirred with a homomixer at 10,000 rpm for 5 minutes, and passed through a homogenizer at a pressure of 20 MPa twice to obtain a stable pre-mixed latex (a-6).
Raw Material Mixture:
component (a1): "YF393" 96 parts
component (a2): "KBM502" 2 parts
component (a3): "AY43-101" 2 parts
anionic emulsifier: sodium dodecylbenzenesulfonate 1.00 part
deionized water 200 parts 10 parts of dodecylbenzenesulfonic acid and 90 parts of deionized water were charged into a separable flask including a cooling pipe to prepare a 10% dodecylbenzenesulfonic acid aqueous solution. The dodecyl-benzenesulfonic acid aqueous solution was heated to 85° C. In this state, 300 parts of the pre-mixed latex (a-6) was dropped into the solution over 2 hours. After dropping was completed, the temperature was kept at 85° C. for 3 hours, and lowered. Next, the reaction product was kept at room temperature for 6 hours, and neutralized with a sodium hydroxide aqueous solution to obtain a polyorganosiloxane rubber (A-6) latex. The solid content of the polyorganosiloxane rubber (A-6) latex was 17.7%, and the volume average particle diameter was 65 nm.

Production Example 7

Production of Polyorganosiloxane Rubber (A-7) Latex

A polyorganosiloxane rubber (A-7) latex was obtained in the same manner as in Production Example 1 except that the component (a1) was changed from "YF393" to "TSF404" (trade name, octamethylcyclotetrasiloxane, made by Momentive Performance Materials Japan LLC). The solid content in the polyorganosiloxane rubber (A-7) latex was 29.1%, and the volume average particle diameter was 410 nm.

The blends of the polyorganosiloxane rubbers in Production Examples 1 to 7 and the measurement results of the volume average particle diameter dv and the toluene-insoluble matter are shown in Table 1.

TABLE 1

|  |  |  | Production Example 1 | Production Example 2 | Production Example 3 | Production Example 4 | Production Example 5 | Production Example 6 | Production Example 7 |
|---|---|---|---|---|---|---|---|---|---|
| Polyorganosiloxane rubber |  |  | A-1 | A-2 | A-3 | A-4 | A-5 | A-6 | A-7 |
| Blend | (a1) | TSF404 | 0 | 0 | 0 | 0 | 0 | 0 | 96 |
|  |  | YF393 | 96 | 96.7 | 97.5 | 98 | 96 | 96 | 0 |
|  | (a2) | KBM502 | 2 | 2 | 2 | 2 | 2 | 2 | 2 |
|  | (a3) | AY43-101 | 2 | 1.3 | 0.5 | 0 | 2 | 2 | 2 |
| Properties | Volume average particle diameter (dv) [nm] |  | 265 | 260 | 258 | 260 | 140 | 65 | 410 |
|  | Toluene-insoluble matter [% by mass] |  | 82 | 60 | 35 | 0 | 85 | 88 | 85 |

Abbreviations in Table 1 indicate the followings.

"YF393": trade name, octamethylcyclotetrasiloxane, made by Momentive Performance Materials Japan LLC "TSF404": trade name, octamethylcyclotetrasiloxane, made by Momentive Performance Materials Japan LLC "KBM502": trade name, γ-methacryloyloxypropyldimethoxymethylsilane, made by Shin-Etsu Chemical Co., Ltd.

"AY43-101": trade name, tetraethoxysilane, made by Dow Corning Toray Silicone Co., Ltd.

Example 1

Production of Graft Copolymer (1) Powder

The first raw material mixture shown below was charged into a separable flask. Replacement with nitrogen was performed by passing a nitrogen stream through the inside of the flask. The temperature was raised while the mixture was stirred. At a point of time when the temperature of the solution reached 50° C., the reducing agent aqueous solution shown below was charged and a first-stage polymerization was initiated. To complete the polymerization of the allyl methacrylate component, the temperature of the solution was kept at 70° C. for 1 hour.

First Raw Material Mixture;

polyorganosiloxane rubber (A-1) latex 251.7 parts (75 parts in terms of the polymer)

polyfunctional vinyl monomer (b1): allyl methacrylate 13 parts polymerization initiator: t-butyl hydroperoxide 0.5 parts deionized water 200 parts Reducing Agent Aqueous Solution;

ferrous sulfate 0.001 parts ethylenediaminetetraacetic acid disodium salt 0.003 parts rongalit 0.24 parts deionized water 10 parts Next, the second raw material mixture show below was dropped into the reaction solution over 10 minutes. The temperature of the solution was kept at 60° C. or more for 1 hour, and a second-stage polymerization was performed. Subsequently, the temperature was lowered to obtain a graft copolymer (1) latex.

Second Raw Material Mixture;

monofunctional vinyl monomer (b2): methyl methacrylate 10 parts monofunctional vinyl monomer (b2): butyl acrylate 2 parts polymerization initiator: t-butyl hydroperoxide 0.5 parts While 500 parts of an aqueous solution obtained by dissolving calcium acetate at a proportion of 5% by mass was stirred, the aqueous solution was heated to 60° C. The graft copolymer (1) latex was gradually dropped into the aqueous solution to solidify the solution. The obtained product was separated, washed with water, and dried to obtain a graft copolymer (1) powder.

(Production of Thermoplastic Resin Composition)

Using a 30 mmφ screw extruder (PCM-30 (trade name), made by Ikegai Corp.), the blended components shown below were melt kneaded at 280° C., and formed into pellets to obtain a resin composition. Next, the obtained resin composition was molded at 280° C. using a 100 t injection molding machine (SE-100 DU (trade name), made by Sumitomo Heavy Industries, Ltd.) to obtain a Charpy impact test piece, a burning test piece, and an HDT test piece.

Blended Components;

graft copolymer (1) powder 5 parts thermoplastic resin: "Iupilon S2000F" (trade name, bisphenol A type polycarbonate, viscosity average molecular weight of approximately 22,000, made by Mitsubishi Engineering-Plastics Corporation) 100 parts phenol antioxidant: "Irganox 245" (trade name, made by Ciba Japan K.K., the formula (1)) 0.3 parts phosphorus antioxidant: "Adeka Stab PEP36" (trade name, made by Adeka Corporation, the formula (2)) 0.3 parts anti-drip agent: Fluon CD123E (trade name, made by ASAHI GLASS CO., LTD., polytetrafluoroethylene (mass average molecular weight of 8000000 to 15000000)) 0.5 parts Examples 2 to 10

A graft copolymer (2) powder to a graft copolymer (10) powder were obtained by the same method as that in Example 1 except that the blend composition was changed as shown in Table 2. Using the obtained graft copolymer (2) powder to graft copolymer (10) powder, thermoplastic resin compositions were produced in the same manner as in Example 1 except that the blend composition was changed as shown in Table 2. Thereby, Charpy impact test pieces, burning test pieces, and HDT test pieces were obtained.

Example 11

A graft copolymer (11) powder was obtained by the same method as that in Example 1 except that the polyfunctional vinyl monomer (b1) was changed from allyl methacrylate to 1,3-butylene glycol dimethacrylate. Using the obtained graft copolymer (11) powder, a thermoplastic resin composition was produced in the same manner as in Example 1 to obtain a Charpy impact test piece, a burning test piece, and an HDT test piece.

Comparative Examples 1 to 11

A graft copolymer (12) powder to a graft copolymer (22) powder were obtained by the same method as that in Example 1 except that the blend composition was changed as shown in Table 3. Using the obtained graft copolymer (12) powder to graft copolymer (22) powder, thermoplastic resin compositions were produced in the same manner as in Example 1 to obtain Charpy impact test pieces, burning test pieces, and HDT test pieces.

Comparative Example 12

A thermoplastic resin composition was produced in the same manner as in Example 1 except that no graft copolymer was used. Thereby, a Charpy impact test piece, a burning test piece, and an HDT test piece were obtained.

The blend composition, and the results of evaluation of the impact resistance, flame retardancy, and heat resistance in Examples 1 to 11 and Comparative Examples 1 to 12 are shown in Table 2 and Table 3.

TABLE 2

|  |  |  |  |  | Example 1 | Example 2 | Example 3 | Example 4 | Example 5 | Example 6 |
|---|---|---|---|---|---|---|---|---|---|---|
| Graft copolymer | Graft copolymer No. |  |  |  | 1 | 2 | 3 | 4 | 5 | 6 |
|  | Blend | Polyorganosiloxane rubber [parts] |  | A-1 | 75 | 75 | 75 | — | — | — |
|  |  |  |  | A-2 | — | — | — | 75 | — | — |
|  |  |  |  | A-3 | — | — | — | — | 75 | 75 |
|  |  |  |  | A-4 | — | — | — | — | — | — |
|  |  |  |  | A-5 | — | — | — | — | — | — |
|  |  |  |  | A-6 | — | — | — | — | — | — |
|  |  |  |  | A-7 | — | — | — | — | — | — |
|  |  | Vinyl monomer (B) [parts] | First stage (b1) | AMA | 13 | 15 | 17 | 15 | 13 | 15 |
|  |  |  |  | 1,3BD | — | — | — | — | — | — |
|  |  |  | Second stage (b2) | MMA | 10 | 8 | 6 | 8 | 10 | 8 |
|  |  |  |  | BA | 2 | 2 | 2 | 2 | 2 | 2 |
|  | Properties | Volume average particle diameter (dv) [nm] |  |  | 285 | 281 | 280 | 280 | 282 | 280 |
|  |  | Graft rate [%] |  |  | 97 | 96 | 94 | 96 | 96 | 97 |
|  |  | Mw of acetone-soluble content |  |  | 33000 | 31000 | 31000 | 31000 | 30000 | 30000 |
| Thermoplastic resin composition | Blend | Thermoplastic resin [parts] |  | PC | 100 | 100 | 100 | 100 | 100 | 100 |
|  |  | Antioxidant [parts] |  | Irg245 | 0.3 | 0.3 | 0.3 | 0.3 | 0.3 | 0.3 |
|  |  |  |  | PEP36 | 0.3 | 0.3 | 0.3 | 0.3 | 0.3 | 0.3 |
|  |  | Anti-drip agent [parts] |  | PTFE | 0.5 | 0.5 | 0.5 | 0.5 | 0.5 | 0.5 |
|  |  | Graft copolymer [parts] |  |  | 5 | 5 | 5 | 5 | 5 | 5 |
|  | Properties | Impact resistance (Charpy impact strength) | 23° C. [kJ/m$^2$] |  | 62 | 58 | 58 | 59 | 58 | 60 |
|  |  |  | −30° C. [kJ/m$^2$] |  | 27 | 28 | 29 | 27 | 24 | 26 |
|  |  | Flame retardancy | Total burning time [sec] |  | 31 | 35 | 31 | 37 | 36 | 33 |
|  |  |  | Determination |  | V-0 | V-0 | V-0 | V-0 | V-0 | V-0 |
|  |  | Heat resistance | HDT 1.8 MPa |  | 118 | 119 | 119 | 119 | 118 | 119 |

|  |  |  |  |  | Example 7 | Example 8 | Example 9 | Example 10 | Example 11 |
|---|---|---|---|---|---|---|---|---|---|
| Graft copolymer | Graft copolymer No. |  |  |  | 7 | 8 | 9 | 10 | 11 |
|  | Blend | Polyorganosiloxane rubber [parts] |  | A-1 | — | — | — | — | 75 |
|  |  |  |  | A-2 | — | — | — | — | — |
|  |  |  |  | A-3 | 75 | — | — | — | — |
|  |  |  |  | A-4 | — | — | — | — | — |
|  |  |  |  | A-5 | — | 75 | — | — | — |
|  |  |  |  | A-6 | — | — | 75 | — | — |
|  |  |  |  | A-7 | — | — | — | 75 | — |
|  |  | Vinyl monomer (B) [parts] | First stage (b1) | AMA | 17 | 15 | 15 | 15 | — |
|  |  |  |  | 1,3BD | — | — | — | — | 15 |
|  |  |  | Second stage (b2) | MMA | 6 | 8 | 8 | 8 | 8 |
|  |  |  |  | BA | 2 | 2 | 2 | 2 | 2 |
|  | Properties | Volume average particle diameter (dv) [nm] |  |  | 290 | 151 | 70 | 435 | 248 |
|  |  | Graft rate [%] |  |  | 95 | 95 | 95 | 93 | 98 |
|  |  | Mw of acetone-soluble content |  |  | 30000 | 35000 | 32000 | 39000 | 32000 |
| Thermoplastic resin composition | Blend | Thermoplastic resin [parts] |  | PC | 100 | 100 | 100 | 100 | 100 |
|  |  | Antioxidant [parts] |  | Irg245 | 0.3 | 0.3 | 0.3 | 0.3 | 0.3 |
|  |  |  |  | PEP36 | 0.3 | 0.3 | 0.3 | 0.3 | 0.3 |
|  |  | Anti-drip agent [parts] |  | PTFE | 0.5 | 0.5 | 0.5 | 0.5 | 0.5 |
|  |  | Graft copolymer [parts] |  |  | 5 | 5 | 5 | 5 | 5 |
|  | Properties | Impact resistance (Charpy impact strength) | 23° C. [kJ/m$^2$] |  | 63 | 59 | 59 | 62 | 63 |
|  |  |  | −30° C. [kJ/m$^2$] |  | 26 | 24 | 23 | 35 | 20 |
|  |  | Flame retardancy | Total burning time [sec] |  | 31 | 30 | 32 | 34 | 40 |
|  |  |  | Determination |  | V-0 | V-0 | V-0 | V-0 | V-0 |
|  |  | Heat resistance | HDT 1.8 MPa |  | 119 | 119 | 119 | 119 | 118 |

TABLE 3

|  |  |  |  | Comparative Example 1 | Comparative Example 2 | Comparative Example 3 | Comparative Example 4 | Comparative Example 5 | Comparative Example 6 |
|---|---|---|---|---|---|---|---|---|---|
| Graft copolymer | Graft copolymer No. |  |  | 12 | 13 | 14 | 15 | 16 | 17 |
|  | Blend | Polyorganosiloxane rubber [parts] | A-1 | 75 | 75 | — | — | — | — |
|  |  |  | A-2 | — | — | 75 | 75 | 75 | 70 |
|  |  |  | A-3 | — | — | — | — | — | — |
|  |  |  | A-4 | — | — | — | — | — | — |
|  |  |  | A-5 | — | — | — | — | — | — |

TABLE 3-continued

| | | | | | | | | | | | |
|---|---|---|---|---|---|---|---|---|---|---|---|
| | | | | | A-6 | — | — | — | — | — | — |
| | | | | | A-7 | — | — | — | — | — | — |
| | | Vinyl monomer (B) [parts] | First stage | (b1) | AMA | 10 | 20 | 5 | 10 | 20 | 25 |
| | | | | | 1,3BD | — | — | — | — | — | — |
| | | | Second stage | (b2) | MMA | 13 | 3 | 18 | 13 | 3 | 3 |
| | | | | | BA | 2 | 2 | 2 | 2 | 2 | 2 |
| | Properties | Volume average particle diameter (dv) [nm] | | | | 285 | 282 | 286 | 281 | 283 | 290 |
| | | Graft rate [%] | | | | 97 | 90 | 96 | 96 | 95 | 97 |
| | | Mw of acetone-soluble content | | | | 30000 | 23000 | 31000 | 30000 | 30000 | 34000 |
| Thermoplastic resin composition | Blend | Thermoplastic resin [parts] | | | PC | 100 | 100 | 100 | 100 | 100 | 100 |
| | | Antioxidant [parts] | | | Irg245 | 0.3 | 0.3 | 0.3 | 0.3 | 0.3 | 0.3 |
| | | | | | PEP36 | 0.3 | 0.3 | 0.3 | 0.3 | 0.3 | 0.3 |
| | | Anti-drip agent [parts] | | | PTFE | 0.5 | 0.5 | 0.5 | 0.5 | 0.5 | 0.5 |
| | | Graft copolymer [parts] | | | | 5 | 5 | 5 | 5 | 5 | 5 |
| | Properties | Impact resistance (Charpy impact strength) | 23° C. [kJ/m$^2$] | | | 63 | 58 | 58 | 60 | 60 | 61 |
| | | | −30° C. [kJ/m$^2$] | | | 19 | 20 | 17 | 18 | 19 | 16 |
| | | Flame retardancy | Total burning time [sec] | | | 51 | 49 | 49 | 42 | 43 | 58 |
| | | | Determination | | | V-1 | V-0 | V-0 | V-0 | V-0 | V-1 |
| | | Heat resistance | HDT 1.8 MPa | | | 115 | 119 | 115 | 116 | 118 | 119 |

| | | | | | Comparative Example | | | | | |
|---|---|---|---|---|---|---|---|---|---|---|
| | | | | | | 7 | 8 | 9 | 10 | 11 | 12 |
| Graft copolymer | Graft copolymer No. | | | | | 18 | 19 | 20 | 21 | 22 | — |
| | Blend | Polyorganosiloxane rubber [parts] | | | A-1 | — | — | — | 75 | — | — |
| | | | | | A-2 | — | — | — | — | — | — |
| | | | | | A-3 | 75 | 75 | — | — | — | — |
| | | | | | A-4 | — | — | 75 | — | 75 | — |
| | | | | | A-5 | — | — | — | — | — | — |
| | | | | | A-6 | — | — | — | — | — | — |
| | | | | | A-7 | — | — | — | — | — | — |
| | | Vinyl monoer (B) [parts] | First stage | (b1) | AMA | 10 | 20 | 15 | — | — | — |
| | | | | | 1,3BD | — | — | — | 5 | 15 | — |
| | | | Second stage | (b2) | MMA | 13 | 3 | 8 | 18 | 8 | — |
| | | | | | BA | 2 | 2 | 2 | 2 | 2 | — |
| | Properties | Volume average particle diameter (dv) [nm] | | | | 280 | 281 | 289 | 242 | 266 | — |
| | | Graft rate [%] | | | | 93 | 94 | 95 | 94 | 98 | — |
| | | Mw of acetone-soluble content | | | | 29000 | 29000 | 24000 | 31000 | 30000 | — |
| Thermoplastic resin composition | Blend | Thermoplastic resin [parts] | | | PC | 100 | 100 | 100 | 100 | 100 | 100 |
| | | Antioxidant [parts] | | | Irg245 | 0.3 | 0.3 | 0.3 | 0.3 | 0.3 | 0.3 |
| | | | | | PEP36 | 0.3 | 0.3 | 0.3 | 0.3 | 0.3 | 0.3 |
| | | Anti-drip agent [parts] | | | PTFE | 0.5 | 0.5 | 0.5 | 0.5 | 0.5 | 0.5 |
| | | Graft copolymer [parts] | | | | 5 | 5 | 5 | 5 | 5 | 0 |
| | Properties | Impact resistance (Charpy impact strength) | 23° C. [kJ/m$^2$] | | | 57 | 58 | 61 | 60 | 60 | 22 |
| | | | −30° C. [kJ/m$^2$] | | | 18 | 18 | 19 | 18 | 15 | 10 |
| | | Flame retardancy | Total burning time [sec] | | | 54 | 42 | 33 | 51 | 58 | 106 |
| | | | Determination | | | V-1 | V-0 | V-0 | V-1 | V-1 | V-1 |
| | | Heat resistance | HDT 1.8 MPa | | | 115 | 118 | 117 | 117 | 119 | 120 |

Abbreviations in Table 2 and Table 3 indicate the followings.

"AMA": allyl methacrylate
"BA": butyl acrylate
"MMA": methyl methacrylate
"1,3BD": 1,3-butylene glycol dimethacrylate
"PC": lupilon S2000F (trade name, made by Mitsubishi Engineering-Plastics Corporation)
"PEP36": Adeka Stab PEP36 (trade name, made by Adeka Corporation)
"Irg245": Irganox 245 (trade name, made by BASF SE)
"PTFE": Fluon CD123E (trade name, made by ASAHI GLASS CO., LTD., polytetrafluoroethylene (mass average molecular weight of 8000000 to 15000000))

As shown in Table 2, the thermoplastic resin compositions in Examples 1 to 11 prepared by blending the graft copolymer of the present invention had high impact resistance, heat resistance, and flame retardancy. These thermoplastic resin compositions also had high Charpy impact strength at −30° C. and exhibited high impact resistance even at a low temperature.

The compositions in Comparative Examples 1, 3 to 4, 7, and 10 used a graft copolymer having a small mass percentage of the polyfunctional vinyl monomer (b1). For this reason, these compositions had heat resistance and impact resistance at a low temperature inferior to those of the thermoplastic resin compositions in Examples 1 to 3, 4, 5 to 7, and 11. These compositions also had a longer total burning time in the UL94V test and inferior flame retardancy.

The compositions in Comparative Examples 2, 5 to 6, and 8 used a graft copolymer having a large mass percentage of the polyfunctional vinyl monomer (b1). For this reason, these compositions had impact resistance at a low temperature inferior to that of the thermoplastic resin compositions in Examples 1 to 3, 4, and 5 to 7. These compositions also had a longer total burning time in the UL94V test and inferior flame retardancy.

The compositions in Comparative Examples 9 and 11 used a graft copolymer produced from a polyorganosiloxane rubber having a low crosslinking density (the content of the toluene-insoluble matter was low). For this reason, the compositions in Comparative Examples 9 and 11 had impact resistance at a low temperature and heat resistance inferior to those of the compositions in Examples 2, 4, 6, and 11 although the mass percentage of the polyfunctional vinyl monomer (b1) was equal to that in Examples.

The resin composition in Comparative Example 12 using no graft copolymer had a longer total burning time in the UL94V test than that of the resin compositions in Examples, and had flame retardancy and impact resistance inferior to those of the resin compositions in Examples.

The invention claimed is:

1. A method of producing a graft copolymer, comprising polymerizing a vinyl monomer (B) containing a polyfunctional vinyl monomer (b1) in the presence of a polyorganosiloxane rubber (A) comprising more than 20% by mass of a toluene-insoluble matter,
    wherein a mass percentage of the polyfunctional vinyl monomer (b1) is 11 to 19% by mass based on 100% by mass of a total amount of the polyorganosiloxane rubber (A) and the vinyl monomer (B).

2. The method of producing a graft copolymer according to claim 1, wherein the polyfunctional vinyl monomer (b1) is allyl methacrylate.

3. The method of producing a graft copolymer according to claim 1, wherein the mass percentage of the polyfunctional vinyl monomer (b1) is 13 to 17% by mass based on 100% by mass of the total amount of the polyorganosiloxane rubber (A) and the vinyl monomer (B).

4. A graft copolymer obtained by the production method according to claim 1.

5. A resin composition comprising 100 parts by mass of a resin and 0.5 to 20 parts by mass of the graft copolymer according to claim 4.

6. The resin composition according to claim 5, wherein the resin is polycarbonate.

7. A molded article obtained by molding the resin composition according to claim 5.

8. The molded article according to claim 7, wherein the molded article is a casing for home appliances.

9. The molded article of claim 7, wherein a total burning time of the molded article having a thickness of 1.6 mm in a UL94V test is 40 s or less.

10. The graft copolymer according to claim 4, wherein when 5 parts by mass of the graft copolymer is blended with 100 parts by mass of a polycarbonate having a viscosity average molecular weight of 22000, 0.3 parts by mass of a phenol antioxidant represented by the following formula (1), 0.3 parts by mass of a phosphorus antioxidant represented by the following formula (2), and 0.5 parts by mass of a polytetrafluoroethylene having a mass average molecular weight of 8000000 to 15000000,
    (1) Charpy impact strength at −30° C. is 20 kJ/m² or more, and
    (2) a total burning time of a molded article having a thickness of 1.6 mm in a UL94V test is 40 s or less:

[Formula 1]

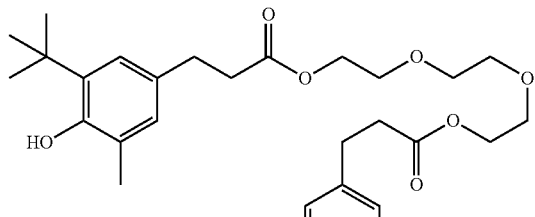

[Formula 2]

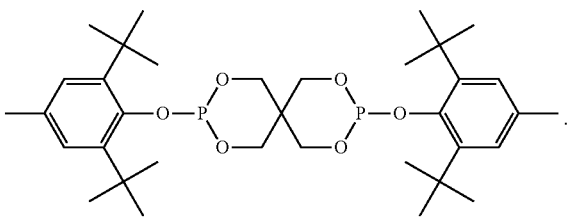

11. The graft copolymer according to claim 10, wherein (3) a deflection temperature under load at a load of 1.8 MPa is 118° C. or more.

12. A resin composition comprising 100 parts by mass of a resin and 0.5 to 20 parts by mass of the graft copolymer according to claim 10.

13. The resin composition according to claim 12, wherein the resin is polycarbonate.

14. A molded article obtained by molding the resin composition according to claim 12.

15. The molded article according to claim 14, wherein the molded article is a casing for home appliances.

16. The graft copolymer of claim 4, having a Charpy impact strength at −30° C. is 20 kJ/m² or more.

17. The method of claim 1, wherein the graft copolymer has a Charpy impact strength at −30° C. is 20 kJ/m² or more.

18. A method of increasing heat resistance and impact resistance in a graft copolymer, the method comprising:
    polymerizing a vinyl monomer (B) containing a polyfunctional vinyl monomer (b1) in the presence of a polyorganosiloxane rubber (A) comprising more than 20% by mass of a toluene-insoluble matter,
    wherein a mass percentage of the polyfunctional vinyl monomer (b1) is 11 to 19% by mass based on 100% by mass of a total amount of the polyorganosiloxane rubber (A) and the vinyl monomer (B), thereby providing increased heat resistance and impact resistance at −30° C., with respect to heat resistance and impact resistance of a graft copolymer wherein a mass percentage of the polyfunctional vinyl monomer (b1) is 10% by mass.

* * * * *